INVENTOR.
HANNS-DIETER PASCHKE
BY Victor D. Behn
ATTORNEY

INVENTOR.
HANNS-DIETER PASCHKE
ATTORNEY

Dec. 12, 1961  HANNS-DIETER PASCHKE  3,012,550
ROTARY MECHANISM BEARING ARRANGEMENT
Filed Oct. 6, 1959  5 Sheets-Sheet 4

INVENTOR.
HANNS-DIETER PASCHKE
BY Victor D. Behn
ATTORNEY

Dec. 12, 1961   HANNS-DIETER PASCHKE   3,012,550
ROTARY MECHANISM BEARING ARRANGEMENT
Filed Oct. 6, 1959   5 Sheets-Sheet 5

INVENTOR.
HANNS-DIETER PASCHKE
BY Victor D. Behn
ATTORNEY

United States Patent Office  3,012,550
Patented Dec. 12, 1961

3,012,550
ROTARY MECHANISM BEARING ARRANGEMENT
Hanns-Dieter Paschke, Neckarsulm, Germany, assignor to NSU Motorenwerke Aktiengesellschaft
Filed Oct. 6, 1959, Ser. No. 844,728
Claims priority, application Germany Oct. 7, 1958
14 Claims. (Cl. 123—8)

This invention relates to rotary mechanisms, such as fluid motors, pumps or internal combustion engines, and is particularly directed to such mechanisms of the type having an outer body with a cavity within which an inner member rotates and is particularly directed to a novel bearing arrangement for such mechanisms.

A known type of such rotary mechanisms comprises an outer body, having axially-spaced end walls with a peripheral wall interconnecting said end walls to form an inwardly opening cavity therebetween having a multi-lobed inner peripheral surface and an inner rotor extending within said cavity with its axis eccentric to that of said cavity and having a plurality of circumferentially-spaced apex portions contacting the peripheral wall of said cavity to form a plurality of working chambers between said inner rotor and peripheral wall which vary upon relative rotation of said inner rotor and outer body.

In one form of such rotary mechanisms the outer body is also rotary about the axis of its cavity so that the axis of the inner rotor is eccentric to that of the outer body. In another form the outer body is stationary and the inner rotor is rotatably supported on the eccentric portion of a shaft with the axis of the shaft being co-axial with the cavity so that inner rotor has a rotary planetary motion relative to the outer body. In both of said forms of rotary mechanism the inner rotor and outer body are interconnected by gearing to enforce the relative motion therebetween.

A detailed description of such rotary mechanisms can be found in copending application Serial No. 774,517, filed November 17, 1958.

An object of this invention comprises the provision of a novel bearing arrangement for minimizing the bending forces imposed on the shafts of such rotary mechanisms by the gas pressures in the working chambers. With the invention therefore, the shafts of such mechanisms can be made smaller and lighter in weight.

In accordance with the invention, in both of the aforedescribed forms of said rotary mechanisms the inner rotor is supported for rotation on an eccentric portion of a shaft co-axial with the cavity of the outer body within which the inner rotor is rotatable and said shaft eccentric portion is supported on cylindrical bearing means extending from at least one end wall of said outer body toward the opposite end wall. In particular said cylindrical bearing means consists of two cylindrical bearing members each secured to one end wall of the outer body and extending toward the bearing member secured to the other end wall.

As already stated the inner rotor and outer body are geared together to enforce their relative rotation. This gearing preferably comprises an internal gear secured to the inner rotor and an external gear secured to the outer body and meshing with the internal gear, said external gear being disposed about and carried by one of said cylindrical bearing members. Hence, the diameter of said external gear limits the diameter of the cylindrical bearing member on which it is carried. Accordingly, the diameter of the other bearing member can be made larger whereby said other bearing will have a stronger resistance to bending. In order to minimize the maximum bending deflection of said bearing members the smaller diameter bearing member is made shorter than the larger diameter bearing member.

The bearing members for the shaft eccentric portion preferably have flanges for detachably securing said bearing members to the end walls of the outer body. Also the gear teeth on the external gear on one of the bearing members preferably abut the adjacent end wall to minimize bending of said member.

In the form of said rotary mechanism in which both the inner rotor and outer body are rotary, the shaft and its eccentric portion are stationary and the drive shaft is connected to the outer body. In accordance with the invention said drive shaft is made hollow and at least one of the outer body walls is provided with a passage so that the engine working fluid can be supplied through said hollow shaft and end wall passage to the engine working chambers. In the case of an internal combustion engine the working fluid is a fuel-air mixture and the fuel can be supplied to the hollow drive shaft by a fuel pipe passing through the eccentric carrying stationary shaft. This latter feature eliminates the need for a seal between the fuel supplying device or carburetor and the rotating drive shaft. The control valve for the combustion air can also be placed in said hollow drive shaft.

Other objects of the invention will become apparent upon reading the annexed detailed description in connection with the drawing in which.

Figure 1:
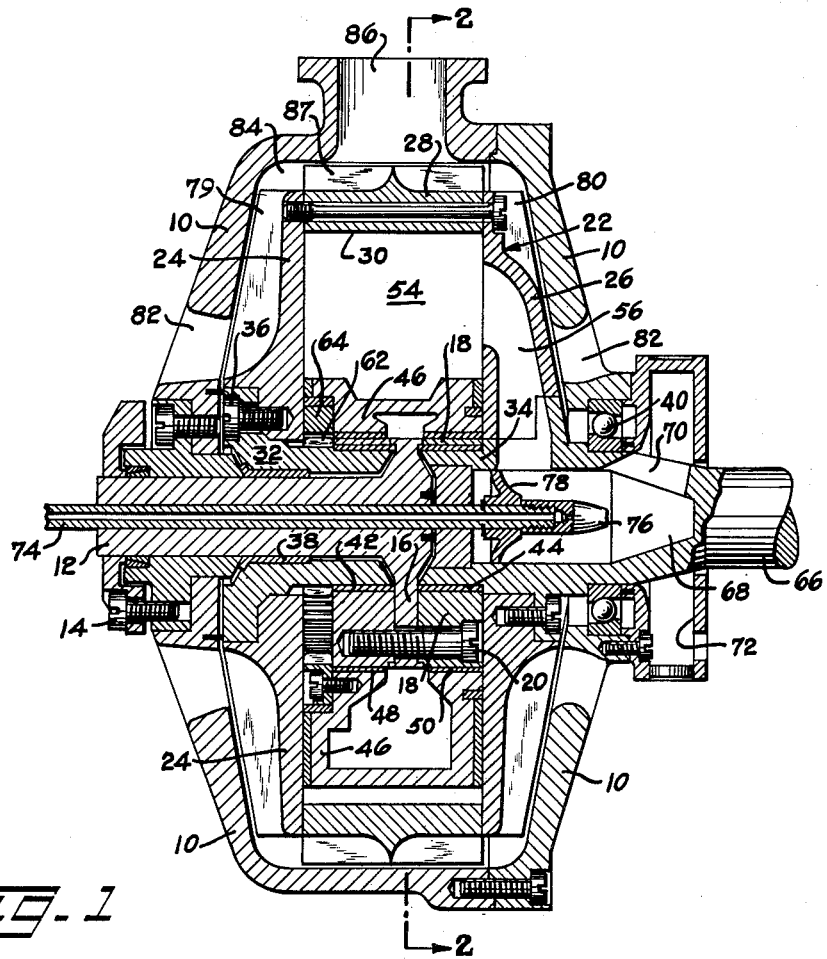
FIG. 1 is an axial sectional view of a rotary mechanism embodying the invention, said mechanism as illustrated being an internal combustion engine in which the outer body is rotary.
Figure 3:
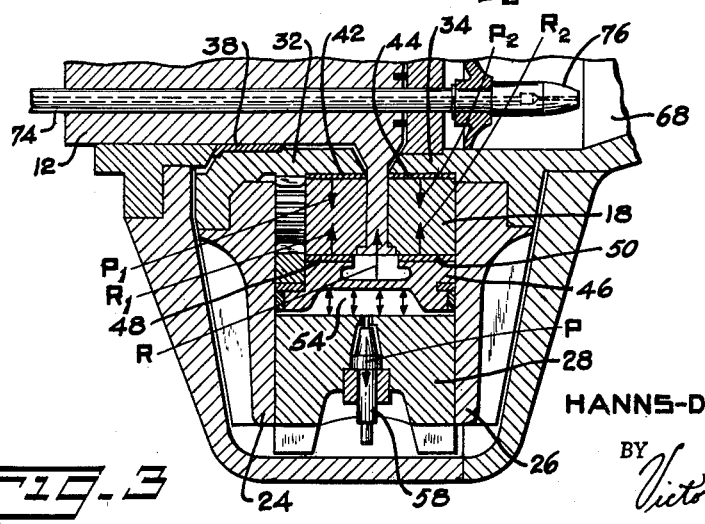
FIG. 3 is a partial axial sectional view showing a working chamber at minimum volume for combustion.
Figure 2:
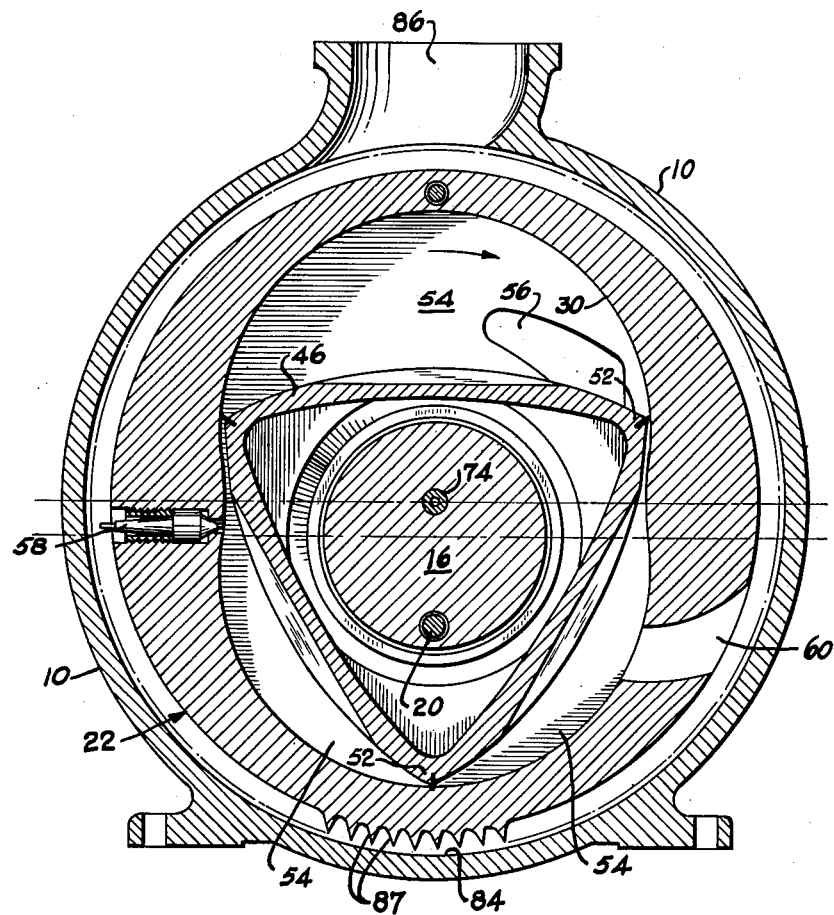
FIG. 2 is a sectional view taken along line 2—2 of FIG. 1.

Referring now to FIGS. 1–3, the rotary mechanism is shown as an internal combustion engine and is of the form in which both the outer body and inner rotor are rotary.

In FIGS. 1–3 the engine has a housing 10 to which a stationary shaft 12 is connected by screws 14. The shaft 12 extends co-axially approximately half way into the housing 10 and has a central disk portion 16 at its inner end. A two-part eccentric portion 18 is secured by screws 20 to the shaft disk portion 16 of the stationary shaft 12.

The rotary outer body 22 of the engine consists of axially-spaced end walls 24 and 26 and a shell 28 is connected between the outer peripheries of said end walls to form an inwardly opening cavity 30 therebetween, the axis of the stationary shaft 12 being co-axial with said cavity. Cylindrical bearing members 32 and 34, co-axial with said cavity, are secured to the end walls 24 and 26 respectively, said bearing members each extending toward but terminating short of the other bearing member with the stationary disk portion 16 disposed between the ends of said bearing members. Each bearing member 32 and 34 is flanged at its outer end for attachment to its end wall by screws 36. The outer body 22 is rotatably supported in the housing 10 by bearings 38 and 40 and the shaft eccentric 18 is supported on said rotary bearing members 32 and 34 by bearings 42 and 44.

An inner rotor member 46 is mounted on the eccentric member 18 by bearings 48 and 50 for rotation about said eccentric, said inner rotor extending within the outer body cavity 30 with its end surface being received between the end walls 24 and 26 of said outer body 22. The inner surface of the outer peripheral wall 28 has a multi-lobed profile and the inner rotor 42 has a plurality of circumferentially-spaced apex portions 52 which engage said peripheral wall to form a plurality of working chambers 54 therebetween which vary in volume upon relative rotation of said inner rotor and outer body. As illustrated the outer body cavity 30 has two lobes and the inner rotor 46 has three apex portions so that three working chambers 54 are formed and the outer body makes three revolutions for each two of the inner rotor.

The outer body 22 also has an intake port 56 in one of its end walls for the admission of a fuel-air mixture into the working chambers 54, a spark plug 58 for igniting said mixture and an exhaust port 60. As fully described in the aforementioned co-pending application such an engine can be operated with a cycle of operation similar to that of a conventional four-cycle internal combustion engine in that it has the four strokes of intake, compression, expansion and exhaust.

An external gear 62 is secured about the bearing member 32, said bearing member being connected to the outer body 22, and an internal gear 64 meshing with said external gear is secured to the inner rotor 46. The gears 64 and 62 have a diameter ratio of 3:2 to enforce the aforementioned relative rotation of the outer body 22 and inner rotor 46.

The engine drive or output shaft 66 is secured to the outer body end wall 26. The inner end of said drive shaft 66 is hollow to form a bore 68. The hollow shaft wall has an opening 70 connecting said shaft bore 68 with a chamber 72 carried by the housing 10. The chamber 72 has openings for admission of air and is arranged to receive an air filter. The end wall 26 to which the drive shaft 66 is connected has the intake passage 56 for supplying air from the air filter chamber 72 and shaft bore 68 to the engine working chambers 54. A conduit 74 is provided for discharging fuel into this air for mixture therewith. The fuel conduit extends through the stationary shaft 12 and into the drive shaft bore 68, said conduit having a nozzle 76 for discharging fuel into the bore 68. A throttle valve 78 is also carried by the conduit 74. The valve 78 is slidably and co-axially fitted within the drive shaft bore 68 and the conduit 74 is slidable through the stationary shaft 12 so that the position of the valve 78 relative to the air intake passage 56 can be varied by sliding the conduit 74 whereby the quantity of air and fuel delivered to the engine working chambers 54 is varied.

The end walls 24 and 26 of the outer body 22 are provided with cooling fins 79 and 80 which function during rotation of the outer body, to blow air thereover from openings 82 in the housing 10. This air cools the outer body 22 and discharges into the annular space 84 between the outer body 22 and housing 10 and then through the outlet opening 86 in the housing 10. The outer surface of the peripheral wall 28 is also provided with cooling fins 87. The engine exhaust gases discharge through the outer body exhaust port 60 into said annular space 84 between the outer body and housing and out through the housing outlet 86. Thus the engine cooling air and exhaust gases mix in the annular space 84 before discharging through the housing outlet 86. The engine cooling air thereby serves to cool the exhaust gases and to muffle engine exhaust noise.

The gas pressure within the engine working chambers 54 acts outwardly on the outer body 22 and inwardly on the inner rotor 46. In FIG. 3 the inner rotor and outer body are shown at a minimum volume position of one of its working chambers 54 at the time of combustion therein. The arrows within said working chamber in FIG. 3 indicate the gas pressure forces on the inner rotor 46 and outer body 22 and the vector P represents the resultant outward force on the outer body 22 and the vector R represents the equal and opposite force on the inner rotor 46. The force R may be considered as divided into two forces R1 and R2 with the force R1 acting inwardly on the eccentric 18 through the bearing 48 and the force R2 acting inwardly on the eccentric 18 through the bearing 50. Similarly the outwardly directed force P on the outer body 22 is divided into two forces P1 and P2 which are transmitted by the outer body end walls 24 and 26 and their cylindrical bearing members 32 and 34 against the eccentric 18 through the bearings 42 and 44. Thus the force P1 substantially directly opposes the force R1 and the force P2 substantially directly opposes the force R2 whereby only small bending moments can occur.

Figure 4:
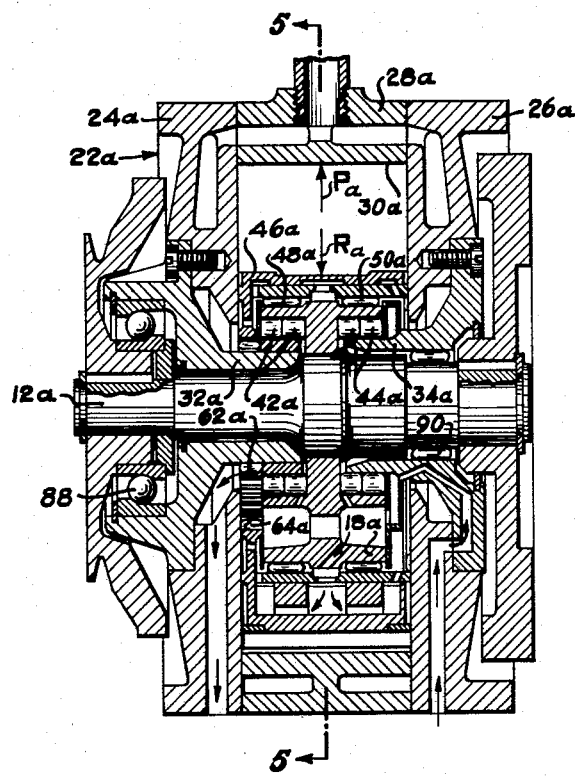
FIG. 4 is an axial sectional view similar to FIG. 1 but illustrating an engine having a stationary outer body, FIG. 4 being taken along line 4—4 of FIG. 5.
Figure 5:
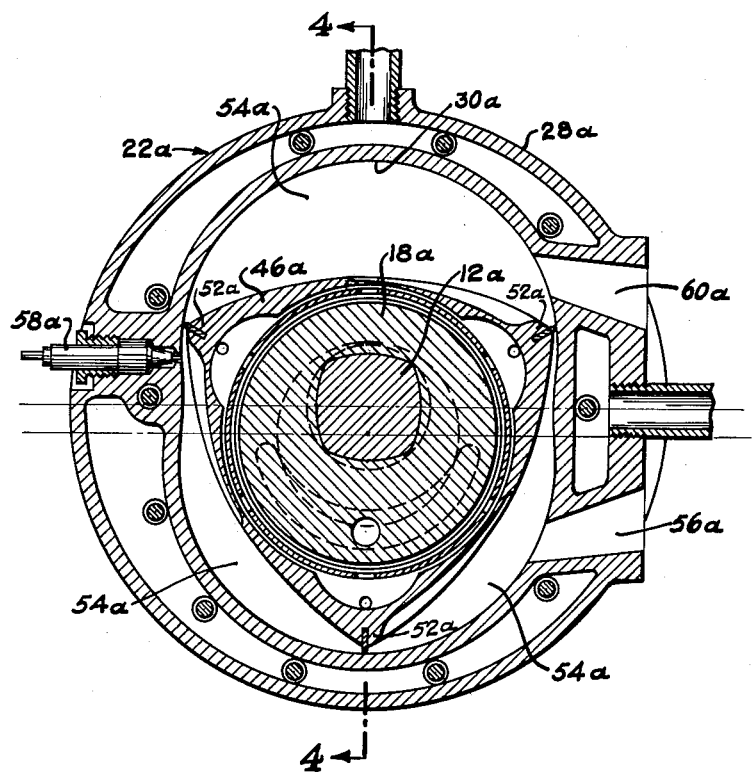
FIG. 5 is a sectional view taken along line 5—5 of FIG. 4.

FIGS. 4 and 5 illustrate an engine similar to that of FIGS. 1–3 but in which the outer body is stationary and the shaft eccentric is rotary. For ease of understanding, those parts of FIGS. 4–5 corresponding to parts of FIGS. 1–3 have been indicated by the same reference numerals but with a subscript *a* added thereto.

In FIGS. 4–5 the outer body 22*a* is stationary and comprises end walls 24*a* and 26*a* interconnected by a shell 28*a* to form a cavity 30*a* therebetween. The shaft 12*a* and its eccentric portion 18*a* are now rotary said shaft being journaled in bearings 88 and 90 carried by the outer body end walls. The end walls 24*a* and 26*a* have cylindrical bearing members 32*a* and 34*a* respectively secured thereto, each said bearing member extending toward but terminating short of the other bearing member. The shaft 12 has a central disk portion 16*a* which extends radially outwardly between the bearing members 32*a* and 34*a*. In FIGS. 4–5 the eccentric portion is integral with said central disk portion instead of being attached thereby by screws as in FIGS. 1–3.

The eccentric portion 18*a* of the shaft 12*a* is supported on said cylindrical bearing members by the bearings 42*a* and 44*a*. The inner member or rotor 46*a* is journaled on the shaft eccentric portion 18*a* by bearings 48*a* and 50*a*. An external gear 62*a* is carried by the bearing member 32*a* connected to the end wall 24*a* of the outer body and an internal gear 64*a* meshes with said external gear and is connected to the inner rotor 46*a*. As in FIGS. 1–3, the gears 62*a* and 64*a* enforce the relative rotation of the inner rotor and outer body. In FIGS. 4–5 the outer body 22*a* is stationary while the inner rotor 46*a* has a planetary rotary motion, said rotor rotating about the axis of the eccentric portion 18*a* of the shaft 12*a*, said eccentric in turn rotating with the shaft 12*a* about the axis of said shaft. As in FIGS. 1–3 the axis of the shaft 12*a* is coaxial with the axis of the cavity 30*a*.

As in FIGS. 1–3 the cavity 30*a* of the outer body has two lobes and the inner rotor has three apex portions 52*a* to form three working chambers 54*a* to which a combustible fuel-air mixture is supplied by the intake passage 56*a*. A spark plug 58*a* is provided for igniting the combustible mixture and the combustion gases discharge through the exhaust passage 60. The vector P*a* represents the resulting force of the outward pressure against the pripheral wall 28*a* in a working chamber and the vector R*a* designates the equal and opposite inward force on the inner rotor 46*a*. As in FIG. 3 the force R*a* divides into two forces acting on the two parts of the shaft eccentric portion 18*a* through the bearings 48*a* and 50*a*. Similarly, the force P*a* divides into two forces which are transmitted by the outer body end walls 24*a* and 26*a* and their cylindrical bearing members 32*a* and 34*a* against the two parts of the shaft eccentric portion 18*a* through the bearings 42*a* and 44*a*. Thus the forces produced by R*a* against the shaft eccentric are substantially directly balanced by the forces produced by P*a* on said shaft eccentric. With this arrangement, therefore, the gas pressures in the working chambers 54*a* exert substantially no bending forces on the shaft 12*a*.

Figure 6:
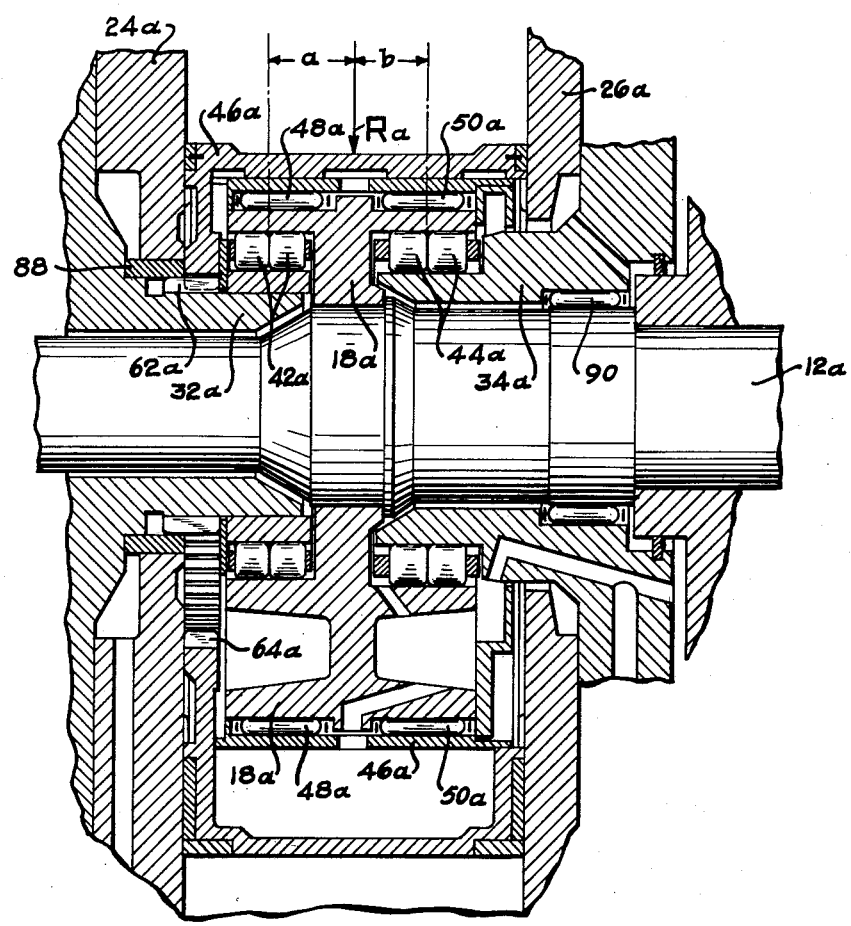
FIG. 6 is a view similar to FIG. 4 but illustrating a modified construction.

FIG. 6 illustrates an engine similar to that of FIGS.

4–5 with only the dimensions of certain parts being modified so that the two cylindrical bearing members carry different loads. The parts of FIG. 6 corresponding to the parts of FIGS. 4–5 have been designated by the same reference numerals.

The cylindrical bearing member 32a carries the external gear 62a thereby limiting the diameter of said bearing member while the other bearing member 34a can have a larger diameter. If, as illustrated, the bearing member 34a has a larger diameter then its resistance to bending is greater than that of the smaller diameter bearing member 32a. In order to keep the maximum bending deflection of the bearing members 32a and 34a as small as possible the smaller diameter bearing member 32a is made shorter than the larger diameter bearing member 34a. As a result the distance a, of the median plane of the bearing 42a for the shorter and smaller diameter bearing member 32a, from the vector R representing the resultant of the inward gas pressure force on the inner rotor is made greater than the distance b of the median plane of the bearing 44a from said force R. With this arrangement, the load on bearing 42a of the smaller diameter bearing member 32a should be less than the load on the bearing 44a of the larger diameter bearing member 34a and therefore the bearing 42a can be designed for a smaller maximum load than the bearing 44a.

In order to further minimize bending of the bearing member 32a the teeth of the external gear 62a are extended axially in FIG. 6 to engage the bore of the end wall 24a through which said bearing member extends. A ring 88 of hard material preferably is inserted between the teeth of the gear 62a and the end wall 24a particularly if said end wall is made of relatively soft material.

The modification of FIG. 6 has been illustrated and described in connection with a rotary engine of the type in which the outer body is stationary, as in FIGS. 4–5. Obviously, however, the modification of FIG. 6 applies equally well to a rotary engine of the type in which both the inner rotor and outer body are rotary as in FIGS. 1–3 since in both types (FIGS. 1–3 and FIGS. 4–5) the external gear (62 and 62a) is carried by the cylindrical bearing member (32 and 32a).

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications.

I claim as my invention:

1. In a rotary mechanism comprising an outer body having axially-spaced end walls and a peripheral wall secured to and interconnecting said ends walls to form a cavity therebetween, an inner rotor received within said cavity for rotation about an axis eccentric to that of said cavity and having portions engageable with the peripheral wall of said cavity to form a plurality of working chambers therebetween which vary in volume upon relative rotation of said rotor and body, and gearing comprising an external gear fixed to the outer body and an internal gear fixed to the inner rotor and meshing with said external gear to enforce said relative rotation; the combination therewith of a member having an external surface eccentric to the axis of said cavity for supporting said inner rotor for rotation thereabout, and at least one of said end walls having cylindrical bearing means secured thereto and co-axial with the cavity axis and extending toward the opposite end wall with said eccentric member having a surface co-axial with said cavity axis and being disposed about said bearing means for support thereby.

2. The combination recited in claim 1 in which said external gear is carried by said cylindrical bearing means.

3. The combination recited in claim 1 and in which said cylindrical bearing means extends through a bore in the end wall to which it is secured and further in which said bearing means is secured to the outer side of said end wall.

4. The combination recited in claim 3 and in which said external gear is carried by said cylindrical bearing means and the teeth of said external gear bear against the bore in the end wall through which said bearing means extends.

5. The combination recited in claim 1 in which said cylindrical bearing means consists of two bearing members each rigid with one of said end walls, co-axial with the cavity axis and extending toward but terminating short of the bearing member secured to the other end wall, and in which said eccentric member has a central portion extending radially outwardly between the spaced ends of said bearing members and said eccentric member has a shaft portion extending from its central portion through a bore in one of the bearing members co-axial with the cavity axis.

6. The combination recited in claim 5 in which one of said bearing members is smaller in diameter and shorter in length than the other and in which said external gear is carried by said smaller bearing member.

7. The combination recited in claim 1 in which said cylindrical bearing means consists of two bearing members each rigid with one of said end walls co-axial with the cavity axis and extending toward but terminating short of the bearing member rigid with the other end wall, one of said bearing members having a smaller external diameter and a shorter axial length as compared to the other.

8. The combination recited in claim 7 in which external gear is disposed about and is carried by said smaller bearing member.

9. The combination recited in claim 1 in which said mechanism is an internal combustion engine, said eccentric member is stationary and said outer body is rotary; said combination also including a hollow shaft connected to said rotary outer body and constituting the engine drive shaft; and means including the hollow interior of said drive shaft and passage means in at least one of said end walls for delivering a fuel-air mixture to said working chambers.

10. The combination recited in claim 9 and including means within said hollow shaft for discharging fuel therein.

11. The combination recited in claim 9 and including a conduit extending co-axially into said hollow shaft for discharging fuel therein.

12. The combination recited in claim 9 including valve means co-axial with said outer body for controlling the supply of air to said working chambers.

13. The combination recited in claim 12 in which said valve means is disposed within said hollow drive shaft.

14. The combination recited in claim 1 in which the surface co-axial with the cavity axis is an internal surface.

References Cited in the file of this patent

UNITED STATES PATENTS 2,134,334    Jones  ------------------- Oct. 25, 1938

FOREIGN PATENTS 583,035    Great Britain ------------ Dec. 5, 1946
633,810    Great Britain ----------- Dec. 30, 1949

UNITED STATES PATENT OFFICE
CERTIFICATE OF CORRECTION

Patent No. 3,012,550                                                    December 12, 1961

Hanns-Dieter Paschke

It is hereby certified that error appears in the above numbered patent requiring correction and that the said Letters Patent should read as corrected below.

In the grant, line 2, for "assignor to NSU Motorenwerke Aktiengesellschaft," read -- assignor to NSU Motorenwerke Aktiengesellschaft, of Neckarsulm, Germany, and Wankel G.m.b.H., of Lindau, Bodensee, Germany, --; line 11, for "NSU Motorenwerke Aktiengesellschaft, its successors" read -- NSU Motorenwerke Aktiengesellschaft, and Wankel G.m.b.H., their successors --; in the heading to the printed specification, lines 4 and 5, for "assignor to NSU Motorenwerke Aktiengesellschaft" read -- assignor to NSU Motorenwerke Aktiengesellschaft, Neckarsulm, Germany, and Wankel G.m.b.H., Lindau, Bodensee, Germany --.

Signed and sealed this 22nd day of May 1962.

(SEAL)
Attest:

ERNEST W. SWIDER
Attesting Officer

DAVID L. LADD
Commissioner of Patents